J. DIMELOW.
MACHINE FOR MAKING PINS FOR ARTIFICIAL TEETH.
APPLICATION FILED SEPT. 11, 1913.

1,176,948.

Patented Mar. 28, 1916.
4 SHEETS—SHEET 1.

WITNESSES

INVENTOR
James Dimelow
BY
ATTORNEY

J. DIMELOW.
MACHINE FOR MAKING PINS FOR ARTIFICIAL TEETH.
APPLICATION FILED SEPT. 11, 1913.

1,176,948.

Patented Mar. 28, 1916.
4 SHEETS—SHEET 4.

WITNESSES
Daniel Webster, Jr.
E. W. Smith.

INVENTOR
James Dimelow
BY

ATTORNEY

UNITED STATES PATENT OFFICE.

JAMES DIMELOW, OF YORK, PENNSYLVANIA, ASSIGNOR TO THE DENTISTS' SUPPLY COMPANY, A CORPORATION OF NEW YORK.

MACHINE FOR MAKING PINS FOR ARTIFICIAL TEETH.

1,176,948.   Specification of Letters Patent.   Patented Mar. 28, 1916.

Application filed September 11, 1913. Serial No. 789,228.

*To all whom it may concern:*

Be it known that I, JAMES DIMELOW, a citizen of the United States, and resident of York, county of York, and State of Pennsylvania, have invented an Improvement in Machines for Making Pins for Artificial Teeth, of which the following is a specification.

This invention relates to the manufacture of pins for dental work, said pins being utilized to secure an artificial tooth to a suitable strip or plate and generally, though not always, being molded directly into the tooth during its construction.

The invention relates more particularly to a machine for automatically carrying out the several steps necessary to the formation of a tooth pin as a complete article of manufacture, and has for an object to provide a machine to which the pin material is fed in the form of a wire or the like, to be automatically cut, worked and shaped so that, after the series of novel steps have been performed, the finished article is discharged or ejected from the machine.

It has for a further object to provide a novel form of guiding, clamping and cutting mechanism whereby the material is properly positioned with respect to the cutting device, held and thereafter severed in predetermined lengths.

It also consists of a novel head forming mechanism, operating in conjunction with the clamping mechanism, whereby the pin is automatically provided with a head of suitable size and contour for the purposes intended.

It further consists of a novel carrying or conveyer device, by means of which partially completed pins are removed from one part of the machine and delivered to another part where the finishing operations take place.

As a further adjunct of my invention I have devised a novel swaging or point forming apparatus operating automatically at a certain time in the cycle of operations and adapted to successively coact with the partially completed pins.

It further consists of other novel features, all of which will hereinafter be fully set forth.

Similar numerals of reference indicate corresponding parts.

Figure 1:
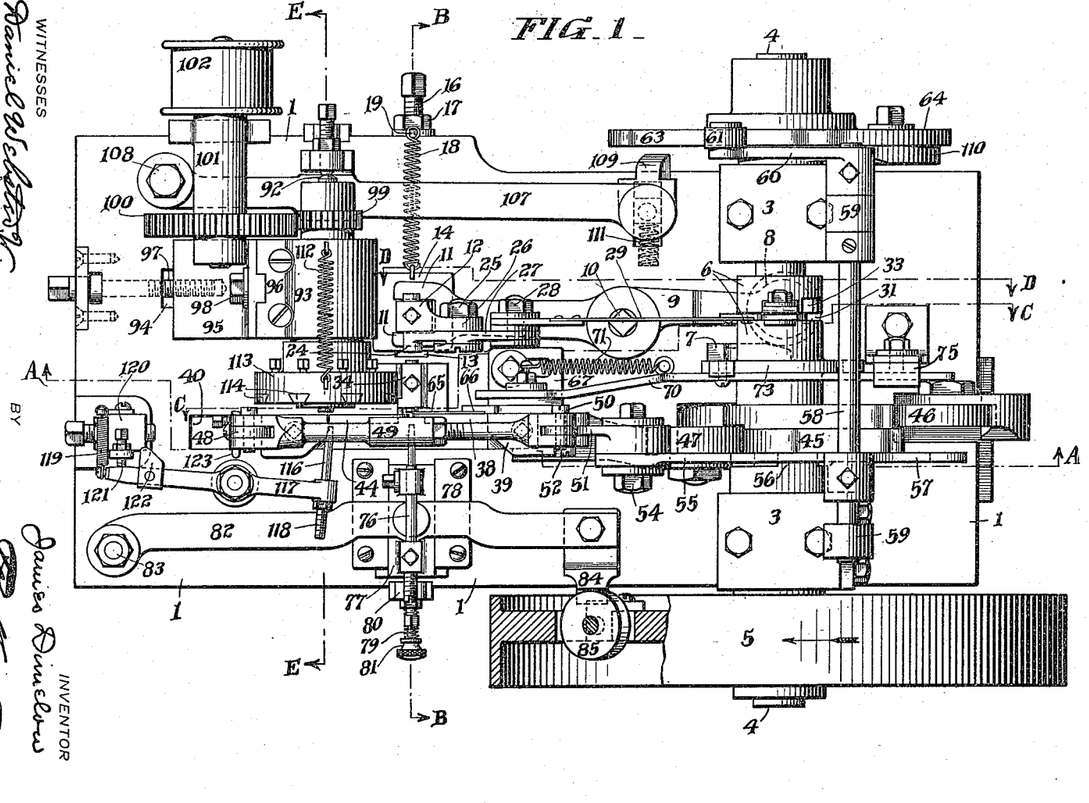
Figure 1 represents a plan of a dental pin machine embodying my invention.

1 designates the bed of my novel pin machine, the same as here shown, being supported on suitable standards 2 and carrying journal boxes 3 for the shaft 4 which may be driven from any suitable source of power transmitted by way of the fixed pulley 5.

6 designates a hub keyed or otherwise secured to the shaft to rotate therewith and carrying a side face cam 7 adapted, during its rotation, to contact with the roller 8 of an arm 9 pivoted at 10 to the bed 1. The outer end of the said arm 9 is bifurcated as shown at 11 and straddles a post 12, slidingly mounted in an opening 13, provided for the purpose in the bed 1. Preferably the post 12 has a plate 14 formed integral therewith which seats on, or has bearing engagement with, the upper surface of the bed, while a second plate 15 is suitably bolted to the bed-interfitting portion of the post and forms a guide to bear upon the lower surface of the bed. In order to permit the proper relative movement between the said post and the bed 1, the opening 13 is proportionately greater than the width or diameter of the post and the length of the stroke of the said post may be varied by means of the adjusting screw 16 which is threaded into the bed and may be locked by the nut 17.

18 designates a spring secured at one end to a part 19 fixed to the bed and at the other end to a hook 20 or like portion of the post 12 so that said spring is normally under tension to maintain the roller 8 of the arm 9 in the path of movement of the cam 7.

21 designates a tubular guide for the wire or like material used in the machine, which is mounted in the post 12 and fixed in position by means of the set screw 22 or like fastening means. It will be noted that the aforesaid guide is transversely divided for a portion of its length and projects at one side of the post 12 in order to expose the wire 23 to the action of a gripping jaw 24 which, in the present instance, is pivoted at 25 to an extension 26 of the post 12. The arm, 27, of which the jaw 24 forms a part, projects beyond the pivot point 25, and is there connected by a fastening member 28 to a lever 29, preferably of spring steel, which extends adjacent the hub 6, and there carries a downwardly projecting lug 30 which normally rides in a groove 31 of the aforesaid hub 6. The function of this groove is to maintain the lever 29 in proper position and prevent side displacement thereof when actuated by the rotation of the hub 6 and the cam element forming a part thereof. Adjacent the lug 30, there is a finger 32 which normally rests upon the periphery of the hub 6, thereby holding the end of the lever 29 in fixed position to maintain the jaw 24 closed to grip the wire or material 23. In order to provide for releasing the wire at certain times, a cam slot 33 is cut in the periphery of the hub 6, and so located as to receive the finger 32 during the rotation of the hub, this construction causing the end of the lever 29 to drop by gravity, and consequently raise or release the jaw 24, as will be readily understood.

The operation of the foregoing parts will be understood when it is stated that the wire 23 is fed to the guide 21 by any suitable means, and when accurately positioned therein, it is gripped by the jaw 24 so as to move with the post 12 at the time the lever 9 is actuated by the cam 7. Of course, the parts are returned to normal position by the action of the spring 18, previously described, as soon as the cam 7 disengages the roller 8. Adjacent the post, 12, there is a standard or bracket 34 having fixed therein, in any suitable manner, a bushing or tubular guide 35 which is normally in alinement with the guide 21 of the post 12, the parts being so related that a movement of the post 12 toward the bracket 34 causes the wire 23 to be fed through the guide bushing 35.

36 and 37 designate, respectively, clamping jaw members positioned at opposite sides of the path of movement of the wire 23, and adjacent the discharge point of the bushing 35, the arrangement being such that as the wire 23 emerges from the bushing 35 under a feeding action, it passes between the aforesaid jaws and is gripped and held fast by them through the operation of the following mechanism: The jaw 36 is removably and adjustably carried by an extension 38 of a head 39, the latter passing through a slot 40 of the bed 1 and comprising the base plate 41, angle member 42 and bar 43, the latter also extending through the slot 40 and having a lug 44 projecting toward the extension 38. A second jaw 37 is removably and adjustably secured to the lug 44. It will be understood that the two jaws are adapted to move together, back and forth, at predetermined times and convey a severed portion of the wire 23 to another part of the machine where a second operation is preferably carried out. The common reciprocating means for the jaws 36 and 37 comprises, in the present instance, a cam 45 fixedly secured to the shaft 4 and having bearing engagement on opposite sides thereof with the rollers 46 and 47, the former serving in the present instance to return the jaw members to their position adjacent the guide 35, while the latter serves to move the said jaws in the opposite direction, as previously referred to, it of course being understood that the said rollers are suitably pivoted to parts of the head 39.

While as before stated, the two jaws are adapted to move together at certain times, provision is also made for relative movement therebetween, in order that they may be opened to receive a pin portion of the wire, closed, and then later opened again to discharge the pin. For this purpose, I have provided a series of levers actuated by a cam for moving the jaw 37 at the desired time, as will now be explained. This construction comprises an arm 48 secured to or forming an extension of the bar 43, and carrying on the apertured end thereof a turn-buckle link 49 pivoted at 50 to a bell crank lever 51, which latter is pivoted at 52 to the extension 53 of the opposite side of the head 39. The bell crank 51 in turn is bolted at 54 to the cam lever 55, the end of which is located in the path of movement of the cam 56 fixed to the shaft 4. In connection with this construction, it will be noted that the bar 43 is preferably of spring steel, in order to give under the cam action and this springing or giving action is sufficient to shift the jaw 37 away from the jaw 36 at the proper time in the cycle of operations, to release the severed portion of the wire. Attention is directed to the fact that I preferably so design the cam 56 that the jaw 37 is held open until both jaws 36 and 37 are brought back to the initial position adjacent the feed guide bushing 35 and a new piece of material fed between them. In order to positively effect the return of the jaw 37 to its strongest gripping relation with the jaw 36, a wiper cam 57 is suitably positioned above the cam lever 55 in order to contact therewith at certain times, the said cam 57 being fixed to a rock shaft 58 suitably journaled in brackets 59 while upon the end of said rock shaft there is an arm 60 carrying a roller 61 adapted to ride upon the cam face 63 of a cam 64, this latter being mounted to rotate with the shaft 4.

Figure 4:
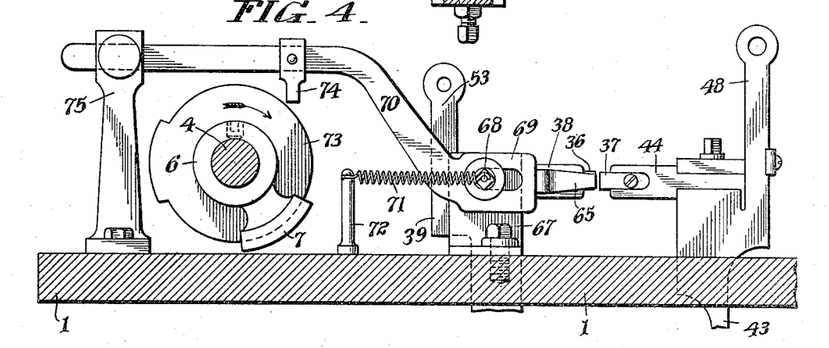
Fig. 4 represents a section on line C—C of Fig. 1.
Figure 5:
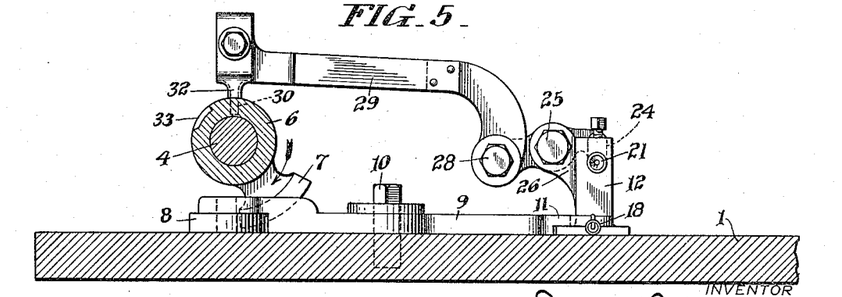
Fig. 5 represents a section on line D—D of Fig. 1.
Figure 6:
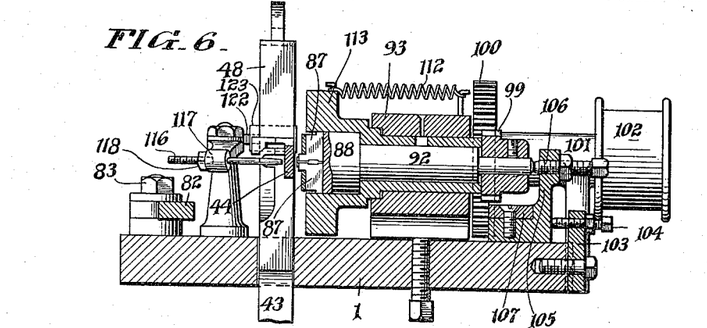
Fig. 6 represents a section on line E—E of Fig. 1.

65 designates a knife or cutter blade mounted for reciprocating movement adjacent the jaw member 36 and adapted to pass at certain times across the face of the guide bushing 35 in order to sever the wire at the desired time. This blade 65 is adjustably fixed to a plate 66 mounted for sliding movement on the bracket 67, and connected by means of the bolt 68 with the slotted end 69 of a cam lever 70. A spring 71 is secured at one end to the bolt 68, and at the opposite end to a post 72 or like part fixed to the bed 1, this serving to return the shearing blade to normal position after a cutting operation. The movement of the blade is effected in the present instance by means of a cam 73 keyed or otherwise secured to the shaft 4 and adapted to engage a trip 74 fixed to the lever 70, this latter, as will be apparent from Fig. 4, having its free end supported and guided by a suitable post 75. It will be noted that the slotted end 69 provides for readjustment of the shearing blade with respect to the adjacent parts.

76 designates a reciprocable hammer fixedly secured to a plate 77 mounted for sliding movement in the guides 78 of the bed 1, the said plate 77 being normally held in one position by means of a spring 79 bearing at one end against a lug 80 of the bed 1, and at the opposite end against the head 81 of a member threaded into the aforesaid plate 77. 82 designates a lever arm suitably fixed to the plate 77 and having one end pivoted at 83 to the bed 1, while its opposite end carries a trip member 84 normally held in the path of movement of a roller 85 carried by the pulley 5. By this construction, it will be seen that, as the pulley 5 revolves, the arm 82 will be intermittently struck by the roller 85, so that the hammer 76 is driven forcibly against the alined end of the wire 23 and upsets a head thereon, after which the spring 79 returns the parts to normal position.

Figure 2:
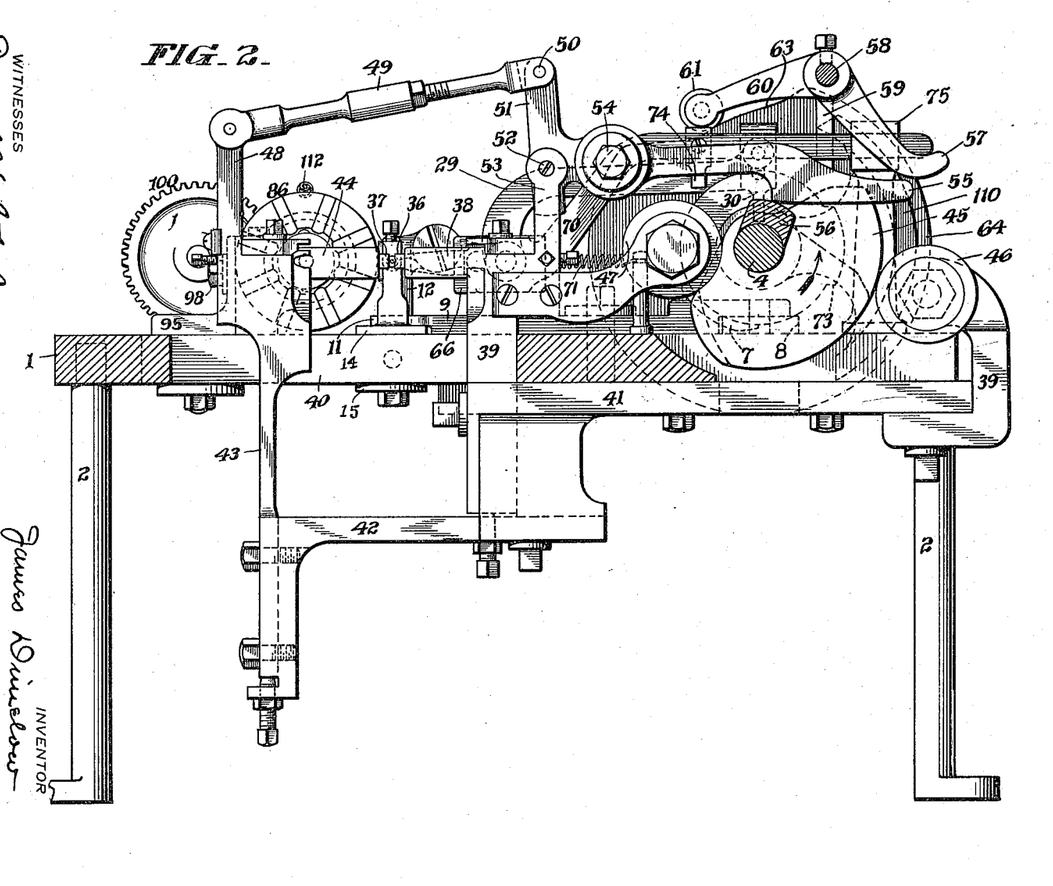
Fig. 2 represents a vertical section on line A—A of Fig. 1.
Figure 3:
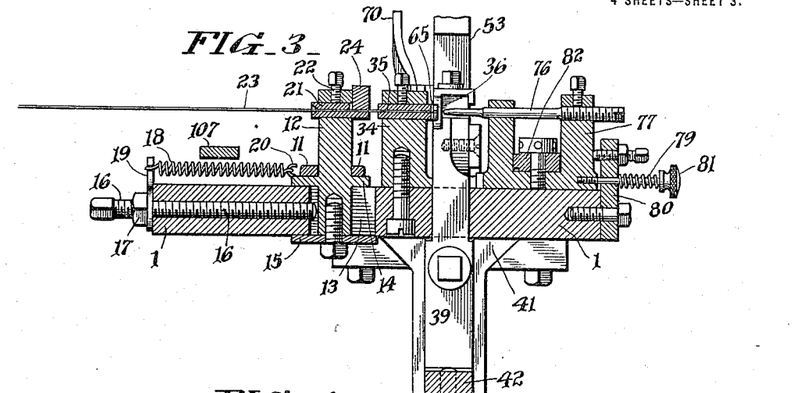
Fig. 3 represents a section on line B—B of Fig. 1.

Following the heading operation just described, the cutting knife or blade 65 is actuated and severs a predetermined length of material, which has been previously fed through the guide member 35, and the severed portion is of course held against displacement by means of the jaws 36 and 37. With the severed, partially formed pin in this position, the cam 45 is in position to engage and actuate the roller 47, so that the head 39 is shifted to the left, as shown in Fig. 2, thereby advancing the two jaws 36 and 37 simultaneously and without releasing their hold upon the pin. At the end of the stroke of the aforesaid head 39, the partially formed pin is positioned in alinement with a chuck member 86 which in the present instance comprises a pair of jaws 87 slidingly mounted in a rotary head 88, and normally held spaced apart by means of a spring 89 seated in an opening 90 formed in the respective jaw members 87. In connection with the jaws 87, it will be noted that the outer or projecting end of each is provided with a tapered opening 91 of substantially the same contour as desired to form the point of the pin under construction. The head 88 is, preferably, formed integral with a shaft 92 suitably mounted in bearings 93, the latter being adjustably carried by the bed 1 through the provision of a slot 94, plate 95, vertical guideways 96 and the adjusting screw 97 and bolt 98. It will be understood from the foregoing that the bearing 93 may be either vertically or horizontally adjusted, according as the member 97 or 98 is manipulated. 99 designates a gear keyed or otherwise secured to the shaft 92, and normally in mesh with a gear 100 carried by a spindle 101 which is driven from any suitable source of power by means of the pulley 102.

103 designates a bracket fixed to the bed 1, and having a stop adjusting screw 104 passing therethrough and into contact with a bracket 105 whereby movement of the latter is limited in one direction. In order to seat the partially completed pin within the aforesaid chuck, and in proper relation to the jaws 87, the shaft 92 is mounted for longitudinal movement through the aforesaid bearing 93, this movement, in the present instance being transmitted through the medium of a bracket 105 mounted for sliding movement upon the bed 1, and having a stud 106 passing therethrough and normally in contact with the end of said shaft 92. To this bracket, a lever 107 is bolted or otherwise secured, the said lever being suitably pivoted at 108 to the bed 1 and having its opposite end provided with a cam finger 109 projecting into the path of movement of a side faced cam 110 fixed to the shaft 4. In order to insure the return of the said arm 107 to normal position, a buffer spring 111 is interposed between a portion of the bed 1 and the trip finger 109.

Figures 7, 8, 9:
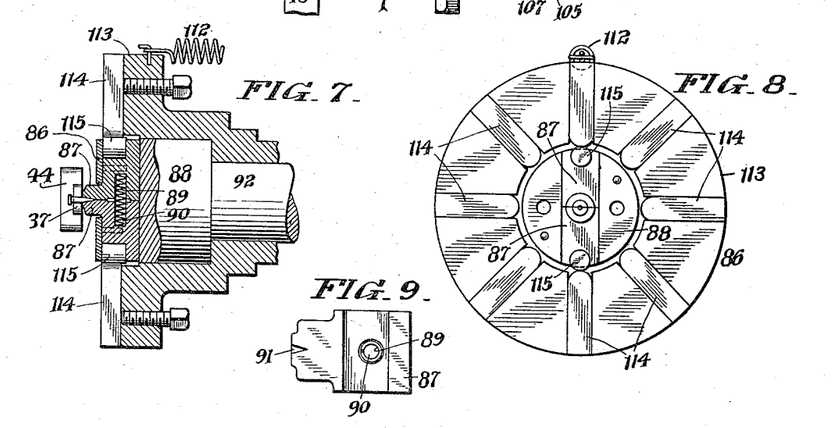
Fig. 7 represents a section of the automatic swaging mechanism.
Fig. 8 represents an end elevation of the automatic swaging mechanism.
Fig. 9 represents an enlarged detail of one side of a swaging jaw.
Figure 10:
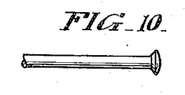
Fig. 10 represents the material after the heading operation.
Figure 11:
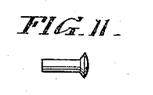
Fig. 11 represents the pin headed and cut to the desired length and Fig. 12 represents the complete pin.
Figure 12:
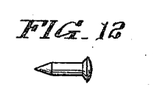

112 designates a spring secured at one end to the fixed bearing 93, and at its opposite end joined to the annular member 113, which contains the rotatable head 88, it being understood that this member is held against rotation while the head 88 rotates within it. The face of the member 113 is radially grooved as shown in Fig. 8, to receive a plurality of fingers 114, the inner ends of which are curved and project into the path of movement of a roller 115 carried respectively by each of the jaws 87, and it will therefore be apparent that as the head 88 revolves, the aforesaid jaws will receive a reciprocating movement due to the alternate contact of the rollers 115 with the fingers 114, and also the action of the spring tending to hold the two jaws normally apart. It will thus be evident that if a piece of material is inserted between the jaws, this reciprocating action of said jaws will tend to swage or work the material and generally tend to make it conform to the opening 91 of the said jaws, this action taking place when the head 88 is shifted to one side into abutting relation with the carrier jaws 36 and 37 to receive the material, as shown in Fig. 7.

116 designates a holder rod fixed to a pivoted arm 117 and adjusted thereon by providing a thread and nut connection 118, the outer end of the said arm 117 having fixed thereto one end of a spring 119, the other end of which is secured to a fixed bracket 120, carrying the stop member 121 to limit the movement of the aforesaid arm in one direction. This arm 117 is moved against the tension of the spring by means of a lug 122, fixed thereon and positioned in the path of movement of a trip 123, here shown as secured to a portion of the reciprocating head 39. The object of the holder rod 116 is to advance, at the proper time in the cycle of operations, and rest against the head portion of the partially completed pin at the moment the unfinished end thereof is engaged by the reciprocable jaw members of the head 88, thereby maintaining the pin locked against longitudinal movement during the swaging operation. As soon as the pin has been pointed by the foregoing operation, the lever 107 retracts the head 113 and the cam 45 picks up the cam roller 46 and returns the carrier jaws 36 and 37 to their initial position. During this return movement, one jaw is moved relatively to the other so as to eject or permit the pin to be discharged from the machine.

The operation of the machine is as follows: The wire or material 23 is manually or automatically fed into the guide 21 and the machine may now be set in operation so that the gripping jaw 24 grasps and clamps the material in the guide upon the movable post 12. As soon as this action takes place, the cam 7 actuates the lever 9 and causes the post 12 to move toward the bracket 34 against the tension of the spring 18, and thereby advancing the wire 23 a certain predetermined distance through the jaws 36 and 37. The cams controlling these jaws thereupon actuate the parts so that the wire is securely clamped in position, and at this instant the cam 7 releases the lever 9 so that the post 12 returns by spring 18 to its original position. With the wire 23 held in clamping position, the hammer rod 76 is actuated by the pulley roller 85, striking the trip 84 and shifting the lever 82 against the tension of the spring 79. The relation between the parts thus actuated is such that the rod 76 impacts with sufficient force against the projecting end of the wire 23 as to upset the material and form a head thereon of the size and shape desired for the pin under construction. The head having been formed upon the pin, and the hammer returned to normal position, the cam 73, controlling the shearing blade, strikes the finger 74, thereby shifting the lever 70 and causing the knife blade to cut the material and sever the predetermined desired length. During the foregoing steps the material guide post 12 has been returned under the action of the spring 18, thereby moving relatively to the material wire 23, in order to obtain another grip upon a new portion of the material so that the foregoing operation may be immediately repeated. While this is taking place, the cam 45 engages the roller 47 and shifts the head 39 so that the jaws 36 and 37 carrying the pin, are moved rearwardly and into alinement with the jaws 87 of the rotatable head 88. When this point is reached, the cam 45 is in such a position that the head 39 cannot move in either direction and the head is ready for the part to be formed by the swaging operation. This operation consists in the advancement of the holder rod 116 through the contact of the trip 123 with the lug 122 so that the rod 116 bears against the formed head of the pin and prevents the latter from being pushed out of the jaws 36 and 37 when the head 88 advances to encircle the projecting end of the pin. The cam 110 now contacts with the lug 109 moving the lever 107 so that the head 88 is held a sufficient length of time in operative relation with the pin, and during this time the head 88 is continuously rotating through the medium of the power transmitted by the pulley 102, shaft 101 and gears 100 and 99. The rotation of the head 88, as before described, causes the jaws 87 to be intermittently driven together, thereby imparting a continuous series of hammer or swaging blows to the pin, the result of which gives the desired point to the article. As the finger 109 is released from the cam 110, the lever 107 is returned to normal position, through the medium of the spring 111, and consequently the completed pin is released from the chuck jaws though still held by the clamping members 36 and 37. At this time, the cam 45 strikes the roller 46 to cause the head 39 to begin its return movement to receive another piece of material. It will be noted that some means are necessary to release the completed pin from the clamping members before another piece of material can be picked up, and for this purpose I provide the wiper arm 55 which is adapted to be engaged by the cam 56, thereby turning the bell crank 51 toward the left, as shown in Fig. 2, and through the turn buckle bar 49, exerting sufficient pressure on the standard 48 so as to cause the spring arm 43 to bend and carry the jaw 37 with it. It will be understood that this movement is a very slight one, but still sufficient to permit the finished pin to drop by gravity from the jaws 36 and 37 and fall out of the machine. The continued movement of the shaft 4 causes the cam 64 to engage the roller 61, and thereby rock the spindle 58 so that the wiper arm 57 strikes the upper side of the arm 55 to return the jaw 37 into gripping relation with the jaw 36 at the moment a new piece of material is forced through the guide bushing 35.

In accordance with the foregoing description, it will be understood that the material or wire is intermittently fed to the machine, there headed, cut and afterward conveyed to the swaging mechanism, where a suitable point is formed on the pin, after which the swaging head is withdrawn, and on the return movement of the jaws 36 and 37 the completed pin is released and drops by gravity. In this manner one partially formed pin follows another in quick succession through the several operations performed by the machine, with the result that a large number of pins can be completed in a minimum amount of time, while all the pins are uniform in size, are each accurately headed, and all provided with a sharpened end. It will be noted, however, that the machine may be used with the omission of the swaging mechanism, as in some instances it is desirable to utilize an unpointed pin in the work for which the pins are intended, and therefore by simply disconnecting or removing the swaging chuck, together with its adjuncts, the pin-forming operation will be completed as soon as the headed wire or material has been cut by the automatically actuated knife blade 65.

It will now be apparent that I have devised a complete unitary structure whereby gold or platinum wire, or wire formed of any suitable material, may be automatically operated upon to form a pin suitable for use in dental purposes, and in general such pins in commercial use have their head ends molded or embedded in the material of which an artificial tooth is composed. That is to say, the head end of one of the pins, formed by my novel mechanism, is placed in suitable position in the mold for a tooth, and then the tooth material is worked into the mold, so that when it is baked and converted into an artificial tooth, the point of the pin remains projecting from the tooth a sufficient distance to form a tie or binding means by which the tooth is fixedly secured to a plate by means of solder or the like. I have previously referred to the contemplated use of pins of this type without having them pointed by the swaging adjuncts of my machine, and commercially such unpointed pins are frequently used by securing the unpointed end of the pin to the tooth by soldering to an anchor inserted into the tooth during the molding operation, thus leaving the head projecting exterior of the completed tooth, so that it may form a tie means when surrounded by rubber or the like.

It will now be apparent that I have devised a novel and useful construction which embodies the features of advantage enumerated as desirable in the statement of the invention and the above description, and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages except as defined by the claims.

Having thus described my invention, what I claim is:—

1. In a machine of the character stated, a bed, a shaft rotatably mounted thereon, a cam fixed to said shaft, a head mounted for sliding movement with respect to said bed and reciprocated by said cam, a clamping jaw adjustably mounted on one portion of said head, a second clamping jaw similarly mounted on another portion of said head and in opposed relation to said first jaw, means for shifting said jaws relatively to each other to clamp and hold the blank formed from the material to be treated, a material guide fixed to said bed and positioned adjacent the meeting point of said jaws, automatic means for intermittently feeding a predetermined length of material through said guide member, a heading device for upsetting the end of said material, means actuated during the rotation of said shaft for severing said predetermined length of material held between the jaws to form the blank, and means for shifting the clamping jaws to deliver the headed blank out of alinement with said heading device.

2. In a machine of the character stated, a bed, a shaft rotatably mounted thereon, a cam fixed to said shaft, a head mounted for sliding movement with respect to said bed, said head embodying an arm of spring material, means carried by said head and located in the path of movement of said cam for causing said head to be reciprocated, a clamping jaw adjustably carried by one portion of said head, a second clamping jaw adjustably carried by said spring arm, means to feed a predetermined length of material between said jaws, a cam controlled lever for causing said spring arm to give or flex, whereby one of said clamping jaws is moved relative to the other clamping jaw, and cam controlled means adapted to coact with said cam controlled lever for positively returning said movable jaw member to gripping relation with the adjacent jaw member.

3. In a machine of the character stated, a bed, a shaft rotatably mounted thereon, a material guide fixed to said bed, means to feed a suitable material through said guide, means actuated by the movement of said shaft for forming a head on said material, a cutting mechanism for severing a predetermined length of said material, an annular member mounted adjacent to but out of alinement with said guide, a rotatable head within said annular member and having an axis out of alinement with said material guide, means independent of said shaft for rotating said head, a pair of swaging jaws slidably mounted in said head and having swaging grooves extending only part way through, a spring directly between the swaging dies for normally holding said jaws apart, a plurality of pins radially and adjustably carried by said annular member and having their inner ends convexedly rounded and held stationary in the path of movement of said swaging jaws, whereby said jaws receive a reciprocatory movement, means to lock said pins in adjusted position, and means to automatically deliver a severed length of said material to the swaging dies.

4. In a device of the character stated, a bed, a guide member fixedly secured thereto, a clamping device positioned adjacent the discharge end of said guide member for holding the blank to be headed during the heading operation, automatic means for operating said clamping device, means to feed a predetermined length of material to constitute the blank through said guide member and partly through said clamping device preliminary to the clamping operation, a hammer movably mounted on said bed and adapted to engage the projecting end of said blank at a predetermined time to form the head thereon, a spring for normally holding said hammer retracted from said clamping device and the blank held therein, a shaft rotatably mounted on said bed, a cam operated mechanism controlled by the movement of said shaft for shifting said hammer and causing it to impact with said blank to form a suitable head thereon, means to move said clamping device and convey the headed blank to a position of delivery out of alinement with said hammer, and means to impart a relative movement of said clamping jaws to release said headed blank at the proper time.

5. In a machine of the character stated, a reciprocatable head having two clamping jaws normally forced together by the spring action of the metal of the head, means for forcing the clamping jaws apart by overcoming the spring action of the head, devices for reciprocating the head and holding it with two periods of rest, timing mechanism for relatively controlling the means and devices, feeding mechanism for feeding a wire between the jaws when forced apart, severing devices for severing the wire on one side of the clamping jaws, and formative devices on the other side of the clamping jaws for shaping the end of the wire held by the clamping jaws.

6. In a machine of the character stated, a reciprocatable head having two clamping jaws normally forced together by the spring action of the metal of the head, means for forcing the clamping jaws apart by overcoming the spring action of the head, devices for reciprocating the head and holding it with two periods of rest, timing mechanism for relatively controlling the means and devices, feeding mechanism for feeding a wire between the jaws when forced apart, severing devices for severing the wire on one side of the clamping jaws, formative devices on the other side of the clamping jaws for shaping the end of the wire held by the clamping jaws during one period of rest of the head, and swaging devices for pointing the wire on the end opposite to the end acted upon by the formative devices during the other period of rest of the head.

7. In a machine of the character stated, a reciprocable head having two clamping jaws normally forced together by the spring action of the metal of the head, devices for intermittently reciprocating said head, means for forcing said clamping jaws apart by overcoming the spring action of the head, feeding mechanism for feeding a wire between said jaws when forced apart, and formative devices for shaping the end of the wire held by said clamping jaws.

8. In a machine of the character stated, a reciprocable head having two clamping jaws normally forced together by the spring action of the metal of the head, devices for intermittently reciprocating said head, means operated in timed relation to the movement of said head for forcing said clamping jaws apart by overcoming the spring action of the head, feeding mechanism for feeding a wire between said jaws when forced apart, a heading device located at one side of said clamping jaws for shaping the end of the wire held by said clamping jaws, and severing devices located at the opposite side of said clamping jaws for severing the wire into predetermined lengths.

In testimony of which invention, I hereunto set my hand

JAMES DIMELOW.

Witnesses:
 WILLIAM SMALL,
 CHARLES L. RODGERS.

Copies of this patent may be obtained for five cents each, by addressing the "Commissioner of Patents, Washington, D. C."